United States Patent [19]

Sobin et al.

[11] 3,906,093

[45] Sept. 16, 1975

[54] MITHRAMYCINS AND PROCESS THEREFOR

[75] Inventors: Ben A. Sobin, Manhassett, N.Y.;
John B. Routien, Lyme, Conn.;
Koppaka V. Rao, Cambridge, Mass.;
William S. Marsh, Wanaque, N.J.;
Aline L. Garretson, East Lansing, Mich.

[73] Assignee: Pfizer Inc., New York, N.Y.

[22] Filed: Aug. 13, 1968

[21] Appl. No.: 752,197

Related U.S. Application Data

[63] Continuation-in-part of Ser. No. 617,442, Dec. 19, 1966, abandoned, which is a continuation-in-part of Ser. No. 317,399, Oct. 15, 1963, abandoned, which is a continuation-in-part of Ser. Nos. 39,572, June 29, 1960, abandoned, and Ser. No. 696,676, Nov. 15, 1957, abandoned.

[52] U.S. Cl. ............... 424/119; 424/123; 424/124; 195/80
[51] Int. Cl. ............................................ A61k 21/00
[58] Field of Search ....... 424/119, 123, 124; 195/80

[56] References Cited
OTHER PUBLICATIONS

Grundy et al., Antibiotics and Chemotherapy, Vol. III, No. 12, 12-1953 pp. 1215-1216.

Philip et al., Antibiotics and Chemotherapy, Vol. III, No. 12, 12-1953 pp. 1218-1220.

Berlin et al., Nature, Vol. 218, April 13, 1968, pp. 193-194.

Bakhaeva et al., Tetrahedron Letters No. 32, 1968, pp. 3595-3598.

Kennedy et al., Cancer Chemotherapy Reports, No. 48, October, 1965, pp. 59 to 63.

*Primary Examiner*—Jerome D. Goldberg
*Attorney, Agent, or Firm*—Connolly and Hutz

[57] ABSTRACT

Mithramycins A, B, and C, methods for their production by fermentation using Streptomyces argillaceus, a new species of Actinomycete, or a new strain of Streptomyces plicatus, and methods for their recovery and separation are described. The products are of use as antimicrobial agents.

15 Claims, 4 Drawing Figures

INFRARED ABSORPTION SPECTRUM OF MITHRAMYCIN-A

Infrared Absorption Spectrum of Mithramycin A (anhydrous)

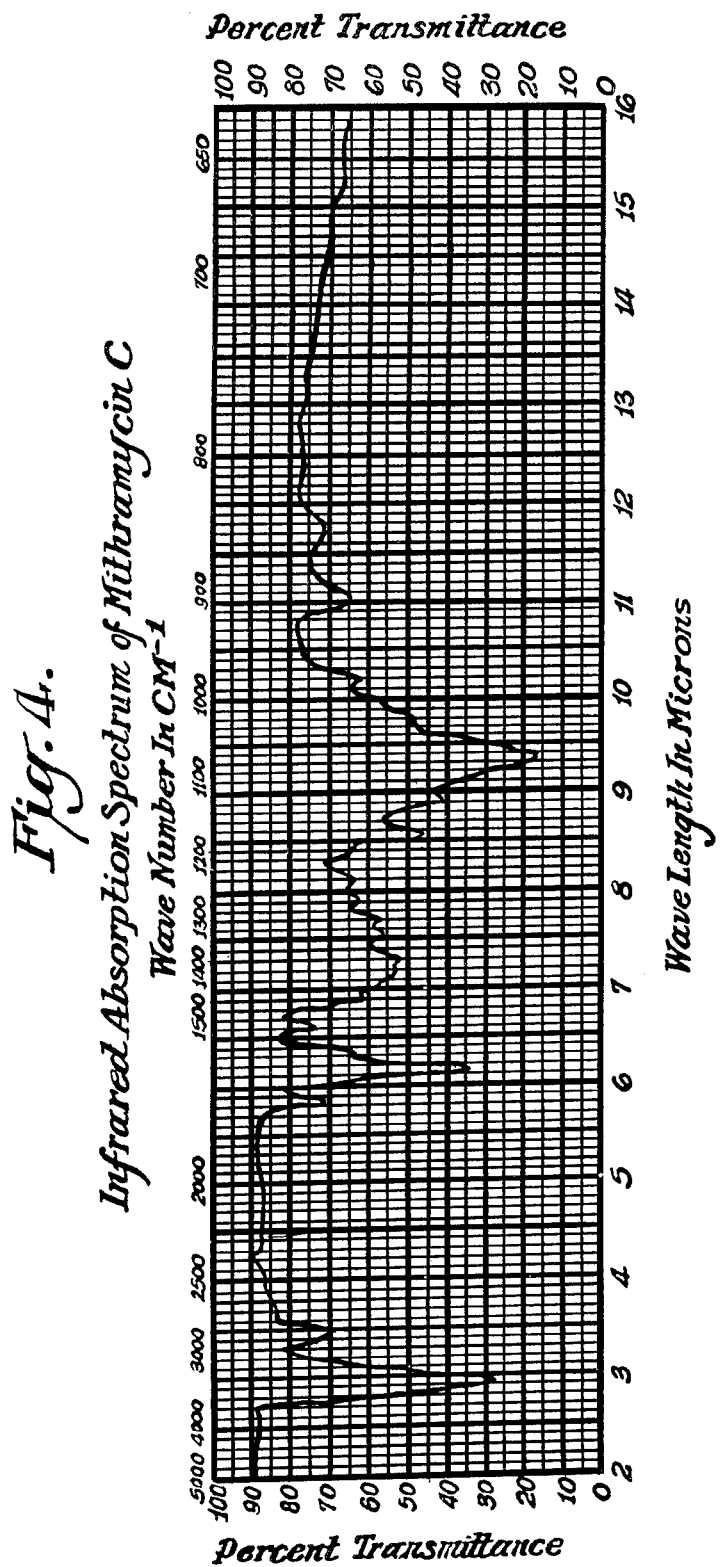

MITHRAMYCINS AND PROCESS THEREFOR

Cross-Reference to Related Applications

This application is a continuation-in-part of copending application Ser. No. 617,442, filed Dec. 19, 1966, which is, in turn, a continuation-in-part of application Ser. No. 317,399, filed Oct. 15, 1963, which is, in turn, a continuation-in-part of application Ser. No. 39,572, filed June 29, 1960, and application Ser. No. 696,676, filed Nov. 15, 1957, all of which are now abandoned.

Background of the Invention

This invention relates to the new and useful fermentation products called Mithramycin A, Mithramycin B, and Mithramycin C, to the salts thereof, and to mixtures of said products and their salts, to their production by fermentation, to methods for their recovery and concentration from crude solutions, such as fermentation broths, and to processes for their purification. The invention includes within its scope these products in dilute forms, as crude concentrates, and also the pure crystalline forms thereof. All of these novel products are useful in combatting microorganisms, especially various Gram-positive microorganisms. In addition, they are useful as disinfectants against such microorganisms and they are useful as an aid in the purification of mixed cultures for medical diagnostic and biological research purposes.

Streptomyces plicatus (Parke-Davis & Company, Culture Bureau, Detroit, Michigan, No. 04918) is known to produce three weakly basic antibiotics, amicetin, plicacetin and bamicetin (Haskell et al, J. Am. Chem. Soc. 80, 743–747 (1958) and British Patent No. 707,332). The products of the present invention, on the other hand, are acidic substances, the properties of which are described below.

SUMMARY OF THE INVENTION

Mixtures of mithramycins A, B and C are produced during the cultivation, under controlled conditions, of either a new species of microorganism which has been designated *Streptomyces argillaceus* or a new strain of a species known as *Streptomyces plicatus*. Mixtures of these closely related antibiotics appear to be always co-produced in the fermentations described herein. (Mithramycin A is the major component). The mixture (referred to as the mithramycin complex in our copending application Ser. No. 39,572) produced by the new strain of *S. plicatus* is made up of about 85–98 percent mithramycin A and 15–20 percent mithramycins B and/or C. These microorganisms were isolated from soil samples and identified by planting and testing cultures thereof on media normally used for such identification, while comparing their cultural characteristics with those described in Waksman and Lechevalier, "Actinomycetes and Their Antibiotics", 1953. A culture of the new species, *Streptomyces argillaceus*, has been deposited with the American Type Culture Collection, Washington, D.C., under the number, ATCC 12956, while a culture of the new strain of *Streptomyces plicatus* has been deposited with the same culture collection under the number ATCC 12957. It is identified in the culture collection of Chas. Pfizer & Co., Inc. as Isolate BA-11028.

The cultural characteristics of the new species, *Streptomyces argillaceus*, are set forth in the following table, wherein the description given is based upon readings made after two weeks of growth. Classification of this new species was made by Dr. John B. Routien, who proposed the name *Streptomyces argillaceus*. The culture ATCC 12956 has been designated the type culture of this new species.

Table I

| Medium | Amount of Growth | Aerial Mycelium and Sporulation | Soluble Pigment | Remarks |
|---|---|---|---|---|
| Pridham's Yeast-Dextrose Agar | — | — | — | Chains of spores straight or wavy or spirals at tip, many chains in clusters; spores almost spherical to oval to cylindrical averaging 1.6–2.01 × 1.0–1.3 $\mu$, but varying from 1.3 × 1.3 $\mu$ to 2.0 × 1.0 $\mu$. |
| Glucose-Asparagine Agar | Poor or poor to moderate | Almost none; gray-white to dark olive | None | Vegetative mycelium yellowish tan to brown; marginal area merulioid; reverse yellowish tan to brown. |
| Skimmed Milk | Poor or poor to moderate | Sparse; yellowish white | Drab | Vegetative mycelium yellowish tan to dark brown; milk coagulated, no peptonization in one tube, two other tubes had no coagulation or hydrolysis; pH change from 6.4 to 5.7. |
| Glucose Agar | Moderate | Sparse to moderate or moderate on lower portion of slant; pale gray | Dark blackish brown | Vegetative mycelium yellowish-grayish tan; reverse yellowish tan to brownish black. |
| Nutrient Agar | Poor | Rare; gray-white | Yellowish brown | Vegetative mycelium colorless; reverse colorless. |
| Synthetic Agar | Moderate | Sparse to moderate; grayish-white | None | Vegetative mycelium colorless; reverse colorless. |
| Calcium Malate | Moderate | Moderate; pale gray becoming darker | Slight yellowish soluble pigment | Vegetative mycelium colorless where visible; reverse grayish tan; malate digested. |

Table I—Continued

| Medium | Amount of Growth | Aerial Mycelium and Sporulation | Soluble Pigment | Remarks |
|---|---|---|---|---|
| Cellulose | Moderate | Good; brownish gray | None | |
| Potato Slants | Moderate to good | Very sparse to moderate (on one tube) | Dark olive brown | Vegetative mycelium dark olive-black; reverse dark olive-brown. |
| Starch Plates | Sparse | Good; grayish white to dark gray | None | Vegetative mycelium colorless where visible; reverse creamy white to yellowish gray; partial hydrolysis (zone of hydrolysis 2.5 cm. in diameter). |
| Gelatin Plates | Moderate | Good; gray to grayish-white | Dark | Vegetative mycelium not visible; colonies depressed, marginal area smooth, lobed, more or less concentrically zoned; reverse dark blackish brown; no liquefaction. |
| Dextrose-Nitrate Broth | Sparse | Sparse; White | Very pale yellow | Vegetative mycelium creamy white; no reduction of nitrates to nitrites. |
| Emerson's Agar | Moderate | Sparse to moderate; white to pale gray | Dark Brown | Vegetative mycelium colorless where visible. |

The cultural characteristics of the mithramycin-producing culture Isolate BA-11028, previously identified as a new strain of *Streptomyces tanashiensis*, are described in Table II which presents a side-by-side comparison with *S. plicatus* (Parke-Davis strain 04918) and *S. tanashiensis*, NRRL B-2122.

Culture BA-11028 was compared with *S. plicatus* (Parke-Davis strain 04918) described in British Patent 707,332, published Apr. 14, 1954, and *S. tanashiensis* (NRRL B-2122). The media or tests used were as follows: tryptone-yeast extract broth (Shirling & Gottlieb, *International Jr. Systematic Bacteriology* 16 (3): 313–340, 1966), yeast extract-malt extract agar (*Int. Jr. Sys. Bact.*), oatmeal agar (*Int. Jr. Sys. Bact.*), inorganic inorganic salts-starch agar (*Int. Jr. Sys. Bact.*), glycerol-asparagine agar (*Int. Jr. Sys. Bact.*), peptone-yeast extract iron agar (*Int. Jr. Sys. Bact.*), tyrosine agar (*Int. Jr. Sys. Bact.*), carbohydrate utilization (*Int. Jr. Sys. Bact.*), gelatin (Gordon & Mihm, *Jr. Bact.* 73: 15–27, 1957), skimmed milk (Difco product), starch agar (20 gm. starch, 0.5 gm. NH$_4$Cl, agar 15 gm., pH 7.0, distilled H$_2$O to 1 liter), Waksman's starch agar A (Waksman, *The Actinomycetes*, 1950), basal medium plus various S sources (Kuster & Williams, *Applied Microbiology* 12, 46–52, 1964), dextrose nitrate broth (Waksman, *The Actinomycetes*, 1950), organic nitrate broth (Gordon & Mihm, *J. Bact.*), Czapek's (Waksman, *The Actinomycetes*, 1950), glucose-asparagine agar (Waksman, *The Actinomycetes*, 1950), nutrient agar (Waksman, *The Actinomycetes*, 1950), and potato plugs (Waksman, *The Actinomycetes*, 1950). Methods were those given in the *Int. Jr. Sys. Bact.* paper of 1966. Temperature of incubation was 28° C. The results are assembled in Table II.

Table II

| Medium | S. tanashiensis | S. plicatus | BA-11028 |
|---|---|---|---|
| Tyrosine Agar | Melanin | No melanin; pink soluble pigment after 4 days growth on medium. | No melanin |
| Tryptone yeast extract broth | Melanin | No melanin | No melanin |
| Dextrose nitrate broth | Nitrites produced | Nitrites produced | Nitrites produced |
| Organic nitrate broth | Nitrites produced | Nitrites produced | Nitrites produced |
| Skimmed milk | Coagulation, peptonization; tan soluble pigment | Coagulation slow and partial, some peptonization, slight pink to tan soluble pigment | Coagulation slow and partial, some peptonization, pink to tan soluble pigment |
| Gelatin | Good liquefaction | Good liquefaction | Good liquefaction |
| H$_2$S production (Lead acetate strips used for detection) | Strong from cysteine, Na$_2$S$_2$O$_3$ and tryptophane and from peptone-iron agar plus yeast extract | Strong in cysteine, proteose peptone, Na$_2$S$_2$O$_3$, peptone and peptone-iron agar plus yeast extract | Same as *S. plicatus* except no H$_2$S from Na$_2$S$_2$O$_3$. |
| Starch agar | No hydrolysis | Very narrow zone | Narrow zone |
| Waksman's Starch agar | Strong hydrolysis | Very narrow zone | Strong hydrolysis |

(Header spanning: *Streptomyces plicatus*, ATCC No. 12957)

Table II—Continued

| Medium | *Streptomyces plicatus*, ATCC No. 12957 | | |
|---|---|---|---|
| | *S. tanashiensis* | *S. plicatus* | BA-11028 |
| Carbon Utilization | yes | yes | yes |
| Glucose | | | |
| Arabinose | 2+ | 2+ | + |
| Dulcitol | — | — | — |
| Fructose | — | 2+ | + |
| Inositol | — | 2+ | + |
| Inulin | — | + | + |
| Lactose | 2+ | 2+ | 2+ |
| Maltose | 2+ | 2+ | + |
| Mannitol | — | 2+ | ± |
| Raffinose | + | + | — |
| Rhamnose | — | 2+ | + |
| Na acetate | — | — | — |
| Sorbitol | — | + | ± |
| Starch | 2+ | 2+ | 2+ |
| Sucrose | — | — | — |
| Trehalose | — | 2+ | 2+ |
| Xylose | 2+ | 2+ | + |
| Waksman's Starch agar | | | |
| Aerial mycelium | gray | gray | gray |
| Reverse | dark gray | light brown | yellowish-brown |
| Soluble pigment | light brown | lacking | lacking |
| Inorganic salts-starch | | | |
| Aerial mycelium | gray | gray | gray |
| Reverse | gray | tan | grayish-olive |
| Soluble pigment | lacking | lacking | lacking |
| Yeast extract-malt extract | | | |
| Aerial mycelium | gray | gray | gray |
| Reverse | light brown | light brown | dark gray |
| Soluble pigment | dark brown | lacking | lacking |
| Synthetic | | | |
| Aerial mycelium | lacking | scant; gray | scant; gray |
| Reverse | colorless | white | white |
| Soluble pigment | lacking | lacking | lacking |
| Nutrient agar | | | |
| aerial mycelium | gray | white | white |
| Reverse | pale tan | cream | cream to brown |
| Soluble pigment | light brown | lacking | lacking |
| Glucose asparagine agar | | | |
| Aerial mycelium | gray | scant; gray | lacking |
| Reverse | brown | white | yellow |
| Soluble pigment | light brown | lacking | lacking |
| Oatmeal agar | | | |
| Aerial mycelium | gray | gray | gray |
| Reverse | brown | dark gray | yellow |
| Soluble pigment | gray-brown | lacking | lacking |
| Potato slices | | | |
| Aerial mycelium | lacking | gray | gray |
| Reverse | dark brown to black | yellowish to yellowish-gray | yellowish to yellowish-gray |
| Soluble pigment | black | very pale gray | very pale gray |
| Microscopic features | | | |
| Inorganic salts-starch | chains of spores mostly straight some curved; mostly >50 | chains mostly RA type, 10% Spira; 10-50 spores per chain | chains 50-75% RA, 25-50% Spira; 10-50 spores per chain |
| Yeast extract-malt extract | chains mostly flexuous, some RA type | chains mostly RA, some Spira | chains mostly RA type |
| Oatmeal agar | spores smooth by electron microscopy | spores smooth by electron microscopy | spores spiny by electron microscopy |

*S. plicatus* was quite different from *S. tanashiensis* in the following ways: producing no melanin; differences in production of H₂S; seven differences in carbohydrate utilization; differences in reverse and soluble pigment on potato and several other media; difference in shape of chains of spores.

BA-11028 was more similar to *S. plicatus* than to *S. tanashiensis*, though it showed the following distinctions from the former: no $H_2S$ produced from $Na_2S_2O_3$; strong hydrolysis of starch; a few differences in carbohydrate utilization; slight differences in color of reverse and of soluble pigment on some media; spiny spores. The slight difference in production of $H_2S$ and of degree of starch hydrolysis seem minor, and the only absolute difference in carbohydrate utilization is on raffinose. The greatest difference is in the surface markings of the spores, and several papers in the literature indicate that the type of marking may not be absolute for some species.

Because of these facts and the fact that *S. plicatus* and BA-11028 are so similar, it is concluded that BA-11028 is a strain of *S. plicatus*.

It is to be understood that the present invention is not limited to use of the aforesaid organisms or to organisms fully answering the above descriptions, which are given only for illustrative purposes. It is especially desired and intended to include the use of naturally occurring or artifically induced mutants and/or variants, such as those which can be produced from the described organisms by various means, including x-radiation, ultra-violet radiation, treatment with nitrogen mustards, and the like. For example, a subculture of BA-11028A which has been found to produce mithramycin is described below. It is identified in the culture collection of Chas. Pfizer & Co., Inc. as Isolate BA-11028A.

BA-11028A is a culture derived from BA-11028 by plating out single spores of the latter and selecting different types of colonies. One of those selected was designated BA-11028A. Since it produced mithramycin, the same compound produced by BA-11028, it was concluded that it was derived from that strain and was not a contaminant.

It was also grown on the media described in Table II at the same time as were the other three cultures. Though it did not look exactly like BA-11028, it is concluded that it still should be designated as a variant of *S. plicatus*.

The differences between BA-11028 and BA-11028A are given as follows: very weak reduction of nitrate to nitrite by the latter; $H_2S$ produced from $Na_2S_2O_3$ (as by *S. plicatus*) by the latter; no growth on rhamnose. On raffinose and sucrose the growth was ± for BA-11028A compared with − for BA-11028, while on mannitol and sorbitol it was − for BA-11028A and ± for BA-11028. Additionally, BA-11028 showed more brown color in the reverse on several media than did BA-11028A.

We wish also to include any organism, regardless of its appearance or physiological behavior, that may be developed by means of transformation, transduction, genetic recombination or some other genetical procedure, using a nucleic acid or an equivalent material from the herein described species, whereby it has acquired the ability to produce the elaboration product here described or to carry on the biochemical change here described.

BRIEF DESCRIPTION OF THE DRAWINGS

The accompanying drawings illustrate characteristic infrared absorption spectra of the various products of this invention.

FIGS. 1, 2, 3 and 4 show the spectra of mithramycin A, mithramycin B, mithramycin A (anhydrous) and mithramycin C, respectively.

DETAILED DESCRIPTION OF THE INVENTION

Figure 1:
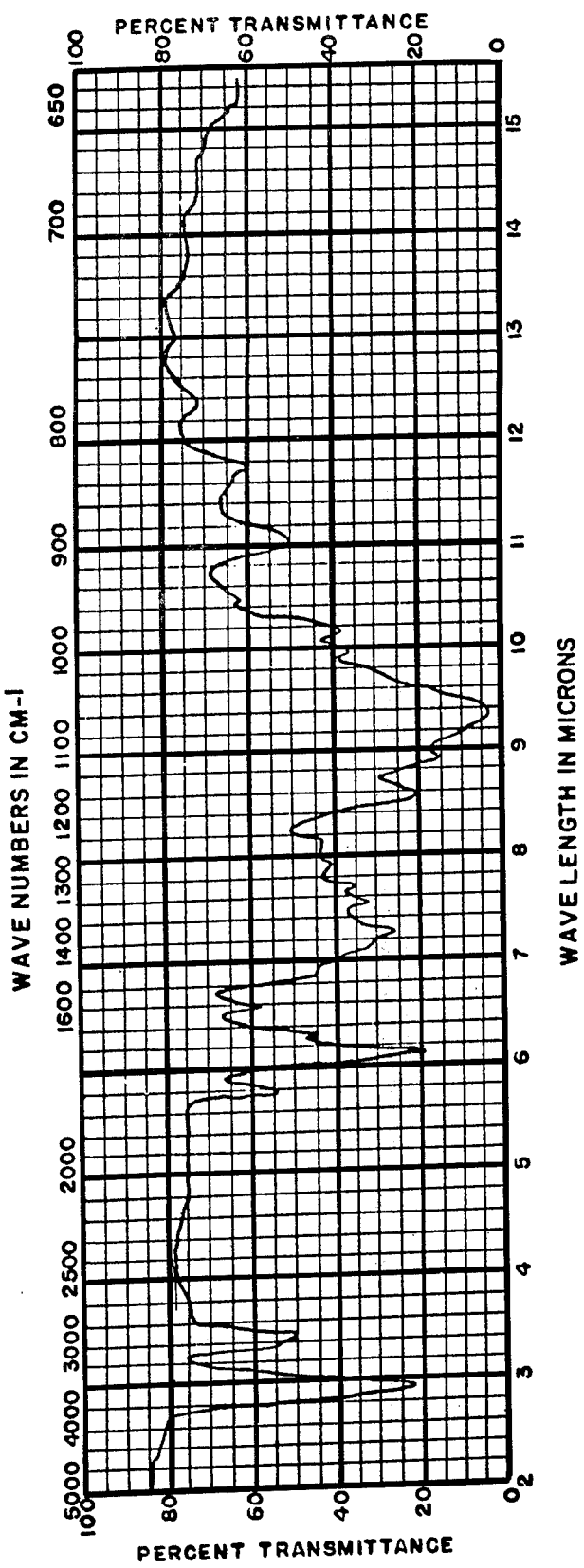

This invention includes within its scope processes for growing the microorganisms *S. argillaceus* ATCC 12956 and *S. plicatus* ATCC No. 12957. The cultivation of these microorganisms preferably takes place in aqueous nutrient media at a temperature of from about 24°–34° C., and under submerged, aerobic conditions with agitation. Nutrient media which are useful for such purposes include a carbohydrate, such as sugars, starch, glycerol, corn meal; a source of organic nitrogen, such as casein, soy bean meal, peanut meal, wheat gluten, cotton seed meal, lactalbumen, enzymatic digest of casein. A source of growth substances, such as distiller's solubles, yeast extract, molasses extract residues, as well as mineral salts, such as sodium chloride, potassium chloride, potassium phosphate, magnesium sulfate, and trace minerals such as copper, zinc and iron, may also be utilized with advantageous results. A particularly useful and preferred medium is one containing dextrose, soy bean meal and potassium phosphate. If excessive foaming is encountered during fermentation, anti-foam agents, such as vegetable oils, may be added to the fermentation medium. The pH of the fermentation tends to remain rather constant, but if variations are encountered, a buffering agent such as calcium carbonate may also be added to the medium.

Inoculum for the preparation of the mithramycin products may be obtained by employing growth from slants of the aforesaid microorganisms on such media as Emerson's agar or beef lactose. The growth may be used to inoculate either shake flasks or inoculum tanks, or alternatively, the inoculum tanks may be seeded from the shake flasks. The growth of the microorganism usually reaches its maximum in about 2 or 3 days. However, variations in the equipment used, aeration, rate of stirring, and so forth, may effect the speed with which the maximum activity is reached. In general, the fermentation is continued until substantial antimicrobial activity is imparted to the medium, a peroid of from about 24 hours to about 4 days being sufficient for most purposes. Aeration of the medium in tanks for submerged growth is preferably maintained at the rate of about ½ to 2 volumes of free air per volume of broth per minute. Agitation may be maintained by means of agitators generally familiar to those in the fermentation industry. Aseptic conditions must, of course, be maintained throughout the transfer of the microorganisms and throughout their growth.

After growth of the microorganism, the mycelium may be removed from the fermentation broth by filtration, centrifugation, or the like. Thereafter, the mithramycin products may be recovered by several different procedures. For example, the filtered broth may be used as is or it may be dried. Preferably, however, the products are further purified. For example, they may be extracted from aqueous solution at substantially neutral to acidic pH conditions, i.e. pH of about 2 to 7, by means of a variety of water-immiscible organic solvents, including the lower alcohols, aromatic alcohols, esters, ketones, halogenated hydrocarbons and mixtures thereof. Examples of these are n-butanol, sec.-butanol, amyl alcohol, hexyl alcohol, benzyl alcohol, ethyl acetate, methyl isobutyl ketone, chloroform, ethylene dichloride and trichloroethylene. Of course, the solubility in these solvents varies somewhat, the lower alcohols and methyl isobutyl ketone being preferred for best results. The mithramycin products may be extracted from most solvent solutions back into water by concentrating the solvent extract and adding a nonsolvent for the antibiotic, such as petroleum ether, cyclohexane, and the like. By adjustment of the pH to the range set forth above, the product may be re-extracted into one of the water-imiscible solvents indicated above. Upon drying the solvent and concentrating the solution, the product separates in crude form.

A more purified form of the mithramycin products is obtained by chromatographing a concentrate resulting from solvent extraction with one of the solvents indicated above, such as methyl isobutyl ketone or butanol. The extract is preferably chromatographed on Florisil (an activated magnesium silicate available from the Floridin Co.) or on an acid-washed alumina column which is then developed with suitable solvents to isolate the mithramycin products. The following flow sheet shows a suitable method of recovering the mithramycin products from the fermentation broth produced by each of the microorganisms previously described:

able solvent, such as methanol-ethyl acetate, results in a mixture of pure microcrystalline mithramycins A, B and C.

The substance referred to in our first filed application, Ser. No. 696,767, as PA 144 is identical with the substance referred to in Ser. No. 39,572 as mithramycin complex and referred to in Ser. No. 317,399 as a mixture of mithramycins A and B. In this mixture the proportion attributable to B is now sometimes found to consist of mithramycin B and/or mithramycin C. Mithramycin B was not described in our first filed application. It is produced in relatively minor amounts compared to mithramycin A and mithramycin C and in some instances may not be produced at all or only in very small amounts. It possesses substantially the same biological activity as mithramycin A, the predominant component, and the mithramycin mixtures produced herein. It appears to be chemically of related structure to mithramycin A in view of the similarity in physical properties of the two substances. Mithramycin C was not described in our earlier filed applications. It possesses less biological activity than does mithramycin A or mithramycin B although it appears to structurally relate to both these materials. Its behavior on paper chro-

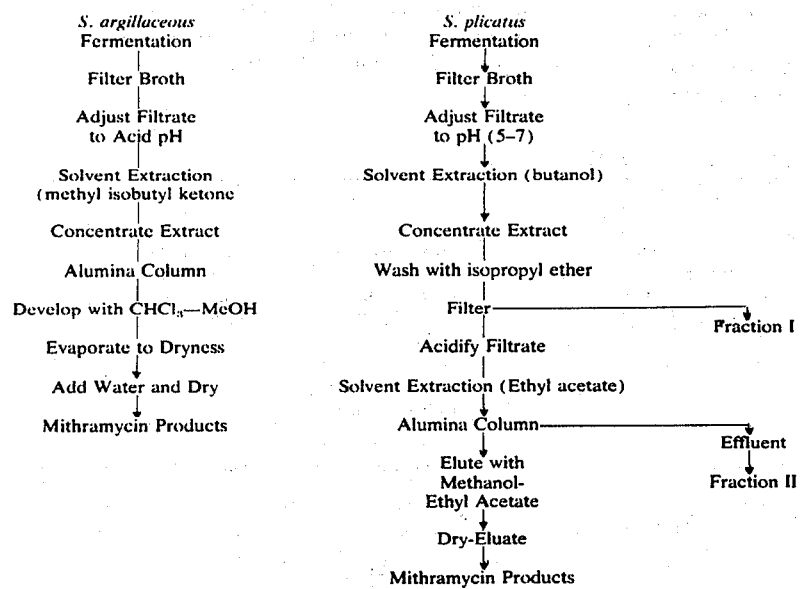

When the mithramycin mixture is produced with S. argillaceus, the alumina column, with the product adsorbed thereon, may be developed with a chloroform-methanol system. Upon evaporation of the eluate, addition of water and drying, a mixture of pure microcrystalline mithramycins is obtained.

On the other hand, with S. plicatus it has been found that certain contaminating products of relatively low biological activity are coproduced, making the recovery procedure somewhat more complicated. These products are herein designated as "fraction I" and "fraction II". In this case, fraction I may be recovered by concentrating the extract resulting from solvent extraction of the filtered fermentation broth. Upon acidification of the filtrate and development thereof on an acid-washed alumina column, fraction II is obtained in the effluent. Elution of the alumina column with a suitmatography is very similar to that of mithramycin B, so similar in fact that the two cannot be distinguished by this method. However, despite this, both mithramycin B and mithramycin C are distinct substances and are different from the materials to which reference was made in our earliest application Ser. No. 696,676 as Fractions A and B and referred train Ser. No. 39,572 as Fractions I and II. The latter substances have only a fraction of the biological activity of the mithramycin mixture.

A recovery procedure particularly adapted to recovery of the mithramycins from fermentation broths is represented schematically in the following flow sheet. The method involves absorption of the active constituents on activated magnesium silicate on Fuller's earth and elution therefrom. When employing Fuller's earth as absorbent, acetone or ethyl acetate may also serve for elution.

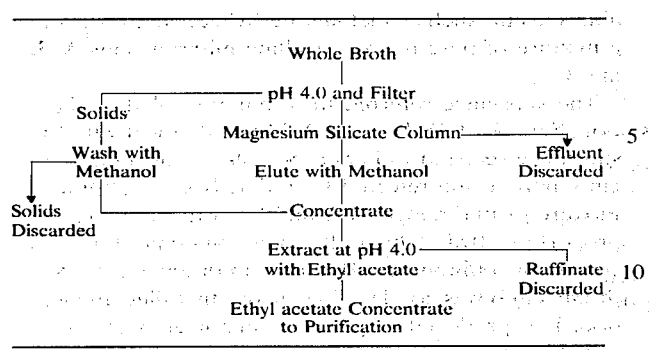

The ethyl acetate concentrate containing the mixture of mithramycins can then be further purified, if desired or necessary, by column chromatography or by countercurrent distribution employing the solvent system 3 percent phosphate buffer pH 7.0–7.5: ethyl acetate in an apparatus providing for 200 transfers. The active material concentrates in tubes 80–160 and is recovered therefrom by concentration of the combined ethyl acetate phase, treatment of the concentrate with ether and extraction with water. The aqueous extract is then frozen and dried from the frozen state.

Pure crystalline mithramycin A, mithramycin B and mithramycin C can be separated from the crude ethyl acetate concentrate from the magnesium silicate or Fuller's earth recovery procedure by chromatography employing a silicic acid or a silicic acid-cellulose powder column. Elution of this column first with ethyl acetate followed by ethyl acetate containing 5 percent by volume of methanol provides in the first fraction, virtually with the solvent front, mithramycin A. Mithramycins B and C are held more tenaciously by the adsorbent and are eluted only when the methanol-ethyl acetate solvent mixture is employed. The products are recovered from the appropriate eluate fractions by concentration and crystallization from butyl acetate, amyl acetate or acetone.

The mithramycin A thus obtained is a dihydrate. It is converted to the anhydrous form by drying at 100° C. for 24 hours over phosphorus pentoxide under reduced pressure, e.g. at 0.05 mm. of mercury.

The molecular formula of mithramycin A calculated from the following analytical data on the anhydrous form is $C_{52}H_{76}O_{24}$.

Hydrolysis (0.1NHCL) of mithramycin A shows it to be composed of an aglycone ($C_{21}H_{24}O_9$), three sugars ($A=C_7H_{14}O_4$; $B=C_6H_{12}O_4$ and $C=C_6H_{12}O_4$).

Table III which appears below contains a tabulation of the physical properties of mithramycin A, hydrated and anhydrous forms, mithramycin A sodium salt and mithramycins B and C. Table IV contains a listing of color reactions observed with mithramycin A. Significant differences in the infrared absorption of mithramycins A and B occur in the region 1228 to 1720 $cm.^{-1}$.

Table III

Figure 2:
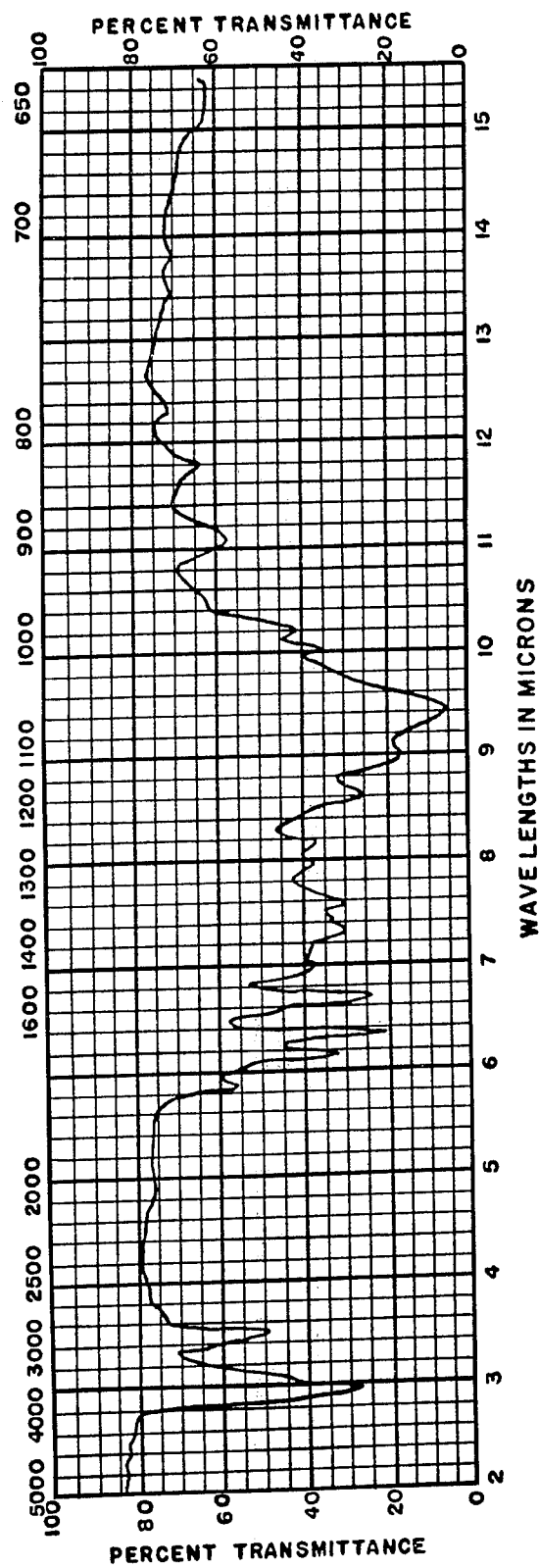
Figure 3:
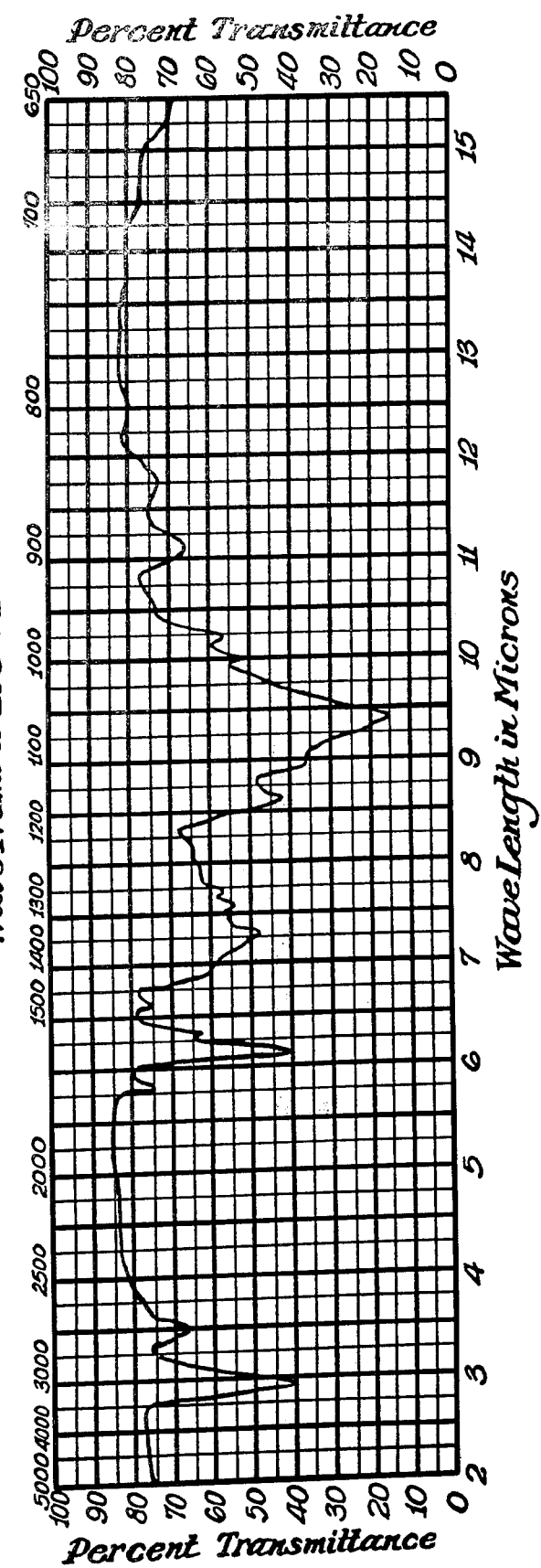

| Property | Mithramycin A | Mithramycin A Sodium Salt | Physical Properties Mithramycin A (Anhydrous Form) | Mithramycin B | Mithramycin C |
|---|---|---|---|---|---|
| Appearance | Yellow crystalline solid | Bright yellow long rectangular prisms | Yellow crystalline solid | Orange yellow microcrystalline solid | Bright yellow crystalline solid |
| Melting Point (° C.) | 184–187° | 270–275° dec. | 184–187° | 170–75° dec. | 182–84° |
| Behavior under ultra-violet light | Dull yellow fluorescence | Bright yellow fluorescence | | Brilliant yellow fluorescence | |
| Ultra-violet spectrum: (Methanol) | 230 mu $E_{1\,cm.}^{1\%}$ = 220 10<br>278 mu $E_{1\,cm.}^{1\%}$ = 480 20 | 240 mu $E_{1\,cm.}^{1\%}$ = 183<br>285 mu $E_{1\,cm.}^{1\%}$ = 475 | 230 mu $E_{1\,cm.}^{1\%}$ = 220 10<br>278 mu $E_{1\,cm.}^{1\%}$ = 500 20 | 230 mu $E_{1\,cm.}^{1\%}$ = 190<br>290 mu $E_{1\,cm.}^{1\%}$ = 312 | 230 mu $E_{1\,cm.}^{1\%}$ = 220 10<br>280 mu $E_{1\,cm.}^{1\%}$ = 550 25 |
| Ultra-violet spectrum: (Water) | 240 mu $E_{1\,cm.}^{1\%}$ = 185<br>285 mu $E_{1\,cm.}^{1\%}$ = 289<br>400 mu $E_{1\,cm.}^{1\%}$ = 102 | 230 mu $E_{1\,cm.}^{1\%}$ = 177<br>280 mu $E_{1\,cm.}^{1\%}$ = 286<br>400 mu $E_{1\,cm.}^{1\%}$ = 97 | | 230 mu $E_{1\,cm.}^{1\%}$ = 210<br>280 mu $E_{1\,cm.}^{1\%}$ 294<br>440 mu $E_{1\,cm.}^{1\%}$ = 62 | |
| Analysis (a) | C, 55.1 (b)<br>H, 7.2<br>O, 37.3<br>(by difference) | C, 54.65 (c)<br>H, 6.95 | C, 57.70<br>H, 7.2<br>O, 37.65<br>(by difference) | C, 55.22<br>H, 7.13<br>O, 37.65<br>(by difference) | C, 55.25<br>H, 6.99<br>O, 37.76<br>(by difference) |
| Equivalent Weight | 1115 ± 15 | | | | |
| Specific Rotation $[a]_{25}^D$ in Methanol (C = 1) | −58° | 38.8° | | | |
| Infrared Spectra (0.03% in KBr) α | 736, 763, 803, 847, 901, 950, 978, 1000, 1064, 1118, 1160, 1228, 1259, 1293, 1320, 1370, 1396, 1440, 1500, 1580, 1626, 1720, 2850, 2910, 2950, 3390 cm.$^{-1}$ (See FIG. 1) | | 806, 852, 908, 952, 983, 1004, 1071, 1126, 1170, 1236, 1266, 1300, 1330, 1374, 1515, 1631, 1724, 2890, 3413 cm.$^{-1}$ (See FIG. 3) | 722, 743, 808, 847, 903, 948, 978, 1000, 1063, 1116, 1160, 1228, 1260, 1322, 1347, 1368, 1430, 1440, 1500, 1585, 1630, 1720, 2850, 2900, 2940, 3380 cm.$^{-1}$ (See FIG. 2) | 848, 905, 980, 1020, 1070, 1166, 1233, 1266, 1293, 1408, 1515, 163, 1706, 3436 cm.$^{-1}$ (See FIG. 4) |

(a) Calcd. for $C_{52}H_{76}O_{24}·2H_2O$: C, 55.70; H, 7.19; O (by difference), 37.10
(b) Calcd. for $C_{52}H_{75}O_{24}Na·2H_2O$: C, 54.16; H, 6.60
(c) Calcd. for $C_{52}H_{76}O_{24}$: C, 57.55; H, 7.08; O (by difference), 35.37

Table IV

| Color Reactions of Mithramycin A | |
|---|---|
| Property | Mithramycin |
| Alcoholic ferric chloride | Green |
| Aq. NaOH | Bright yellow |
| Conc. H$_2$SO$_4$ | Deep brownish violet |
| Aq. Na$_2$S$_2$O$_4$ | No change in the yellow color |
| 2,4-Dinitrophenylhydrazine | Brick red precipitate |
| Diazonium reagent | Couples to form a red color |

The mithramycins are acidic substances are readily form salts with bases, e.g. alkali and alkaline earth metal hydroxides and carbonates. They also form complexes with polyvalent metal ions and are, therefore, useful for inactivating metal ions, e.g. in biological experimentation and in metal separations.

Mild hydrolysis of mithramycin A with 2–10 percent acetic acid at 100° C. for 20–30 minutes or with 0.1NHCl at room temperature overnight produces a product which appears to be identical to mithramycin C.

Mithramycins A, B and C may be assayed individually or as mixtures by observing their activity against various tumors, such as Sarcoma 180 in mice and H.S. No. 1 or C.A. 755 in rats, in tests more fully described hereinafter. However, a more convenient assay involves the use of the microorganism *B. subtilis* as the test organism. A serial dilution type of assay is employed, with the last dilution at which a distinct zone of inhibition occurs, being the number of dilution units/ml. of sample. By comparing this with the result obtained in the same test with a purified standard, the potency of the sample is readily computed. In the assay of mixtures, the C component, because of its lower biological activity relative to that of mithramycins A and B, contributes relatively little to the observed activity. The principal contribution arises from mithramycin A, the predominant component. The remainder of the observed activity is due to the B and/or C components which may be present. The contribution of B when B is present usually outweighs that from mithramycin C.

A more convenient and reliable assay method comprises thin layer chromatography on silica gel with the system methyl ethyl ketone:methanol:isopropanol (8:1:1). In such an assay of a mixture of mithramycins A, B and/or C, the separated mithramycin B and/or C spot is removed from the plate, eluted with methanol and the optical density of the eluate read at 280 m$\mu$. Assay of four mixtures of mithramycins A, B and/or C isolated from S. plicatus fermentations by the procedure of Example VII gave the following values for mithramycins B and/or C: 2.0, 2.8, 3.8 and 4.8 percent. These values are representative for the isolated naturally produced mixtures As stated, the mithramycin mixture is particularly active against Gram-positive organisms. The following table illustrates the antimicrobial spectrum of the mixture against a variety of microorganisms. These tests were performed under standardized conditions in which nutrient broth containing various concentrations of the test material was seeded with the particular organisms specified, and the minimum concentration (MIC) at which growth of each organism failed to occur was observed and recorded.

Table V

Antimicrobial Spectrum of a Mithramycin Mixture
(Approximately 85% A, 15% B and/or C)

| Organism Tested | Minimum Inhibitory Concentration (MIC) mcg./ml. |
|---|---|
| Aerobacter aerogenes | >100 |
| Escherichia coli | >100 |
| Proteus vulgaris | >100 |
| Pseudomonas aeruginosa | >100 |
| Salmonella typhosa | >100 |
| Klebsiella pneumoniae | >100 |
| Salmonella pullorum | >100 |
| Neisseria gonorrhoeae | >100 |
| Hemophilus influenzae | >100 |
| Phytomonas tumefaciens | >100 |
| Erwinia amylovora | >100 |
| Shigella sonnei | >100 |
| Malleomyces mallei | >100 |
| Brucella bronchiseptica | >100 |
| Desulfovibrio desulfuricans | >100 |
| Vibrio | >100 |
| Streptococcus pyogenes | 0.078 |
| Streptococcus faecalis | 2.5 |
| Diplococcus pneumoniae | 0.39 |
| Erysipelothrix rhusiopathiae | 0.001 |
| Corynebacterium diphtheriae | 0.078 |
| Listeria monocytogenes | 0.156 |
| Bacillus subtilis | 0.039 |
| Bacterium ammoniagenes | 0.078 |
| Lactobacillus casei | 0.078 |
| Staphylococcus aureus Mayo Strain M1 | 0.156 |
| Staphylococcus aureus - Mayo Strain M2 | 0.78 |
| Staphylococcus aureus - Mayo Strain 400 | 0.312 |
| Staphylococcus aureus - Mayo Strain M12 | 0.078 |
| Staphylococcus aureus - Mayo Strain M13 | 0.078 |
| Micrococcus pyogenes var. aureus 5 | 0.039 |
| Micrococcus pyogenes var. aureus 376 | 0.156 |
| Micrococcus pyogenes var. aureus Mlr | 0.078 |
| Micrococcus pyogenes var. aureus P/r | 0.078 |
| Micrococcus pyogenes var. aureus 93/r | 0.078 |
| Micrococcus pyogenes var. aureus 105/r | 0.625 |
| Micrococcus pyogenes var. aureus 122/r | 0.078 |
| Micrococcus pyogenes var. aureus TM/r | 0.156 |
| Micrococcus pyogenes var. aureus | 0.039 |
| Candida albicans | >10 |
| Saccharomyces cerevisiae | >10 |
| Mycobacterium 607 | <0.19 |
| Mycobacterium berolinense | 0.39 |

On the other hand, the mithramycin mixture was found to have only slight activity against various fungi, as indicated by the results in the following table, wherein + indicates growth, and − indicates no growth. These tests were conducted upon agar at concentrations of 1000, 100, 10 and 1 mg./ml.

Table VI

Antifungal Spectrum of a Mithramycin Mixture
(Approximately 85% A, 15% B and/or C)

| | 1000 | 100 | 10 | 1 |
|---|---|---|---|---|
| Histoplasma capsulatum | − | − | − | pi* |
| Blastomyces brasiliensis | + | + | + | + |
| Trichophyton rubrum | + | + | + | + |
| Candida albicans No. 8 | pi* | + | + | + |
| Alternaria solani | + | + | + | + |
| Pythium debaryanum | + | + | + | + |
| Aspergillus niger | + | + | + | + |
| Penicillium funiculosum | + | + | + | + |
| Cladosporium (Hormodendrum) cladosporioides | + | + | + | + |

*pi indicates partial inhibition

Activity against various resistant strains of Mycobacterium *tuberculosis* was determined by testing the mithramycin mixture in Dubos' medium and incubating for a period of 14 days. The results of these tests are set forth in the following table.

Table VII

| Strain | Activity Against Mycobacterium tuberculosis<br>Minimum Inhibitory Concentration (mcg./ml.) |
|---|---|
| H37Rv (ATCC) | 100 |
| SM - resistant | 100 |
| INA - resistant | 50 |
| Ravenel | 50 |

Comparative antibacterial activities for pure crystalline mithramycin A and mithramycin B appear in Table VIII.

Table VIII

| | Antibacterial Activity<br>MIC mcg./ml. | |
|---|---|---|
| Microorganism | Mithramycin A | Mithramycin C |
| Staphylococcus aureus | 0.156 | 0.312 |
| Streptococcus pyogenes | 0.078 | 0.078 |
| Diplococcus pneumoniae | 5.0 | 1.25 |
| Staphylococcus aureus 376 (antibiotic+ resistant) | 0.312 | 0.312 |
| Staphylococcus aureus 400 (antibiotic* resistant) | 0.039 | 0.078 |
| Staphylococcus aureus Ml (antibiotic+ resistant) | 0.156 | 0.312 |
| Escherichia coli | 10 | 10 |
| Salmonella typhosa | 10 | 10 |

+ penicillin and streptomycin
* penicillin, streptomycin, tetracycline and erythromycin The mithramycins are relatively toxic substances. A lethal dose in mice was found to be of the order of 2000 mcg./kg. of body weight. The substance was less toxic by the subcutaneous route. In seven-day chronic toxicity tests on healthy mice to which a purified microcrystalline mithramycin mixture (about 95% A – 5% B and/or C) was administered (two 0.5 ml. injections daily of aqueous solutions containing appropriate drug concentrations), the $LD_{50}$ was found to be 1500 mcg./kg.

Although mithramycin mixtures and the A, B and C components thereof may be administered parenterally, either as an aqueous solution or dissolved in physiological saline, in the treatment of various infections in animals, including human beings (as regards mithramycin A or mixtures of A, B and/or C containing at least 85% A), various types of pharmaceutical preparations may advantageously be compounded therewith. These preparations may include both liquid diluents suitable for extemporaneous preparations of solutions prior to administration. Illustrative of such diluents are: propylene glycol, diethylcarbonate, glycerol, sorbitol, etc. While other routes of administration are possible, the parenteral routes are generally preferred. The various dosage forms may contain buffering agents, as well as local anesthetics and inorganic salts to afford desirable pharmacological properties.

The techniques of isolated perfusion and regional perfusion, particularly the latter, have shown promise when preparations of mithramycin products are used as the chemotherapeutic agent.

For most purposes, the solid preparations of mithramycin products, i.e. of mithramycin A, mithramycin B and mixtures thereof, should contain the compounds in an amount of at least 0.05 mcg./mg. of the composition. Liquid preparations containing the active ingredient may be administered directly, e.g. by syringe or, more desirably, by infusion. For direct administration an aqueous solution containing up to 0.5 mg. per ml. of solution is convenient. For infusion the active ingredient is desirably diluted, for example, with isotonic glucose to one liter and administered gradually over a 6–8 hour period. This latter method eliminates or at least minimizes gastrointestinal symptoms which may occur on direct administration. The liquid preparations, such as aqueous solutions, are particularly advantageous when the compound is employed in an amount of from about 0.1 to 2.5 mg./ml. of solution or suspension.

Preparations comprising pure mithramycin A or pure mithramycin B and mixtures thereof in any proportions can be used. The naturally occurring mixtures such as are produced by the herein described methods in which mithramycin A is the major active ingredient as well as artifically produced mixtures in which the proportions of mithramycins A and B may range from substantially pure A to substantially pure B are useful. From a practical standpoint, however, it is convenient to use the naturally occurring mixtures in which the proportions of mithramycin A to B and/or C range from about 85%–98% to about 15%–2% B and/or C.

The following examples are provided to illustrate specific processes for preparation of the mithramycin complex and separation thereof into the pure crystalline A, B and C components. They are provided for illustrative purposes and are not intended to limit the scope of the invention.

EXAMPLE I

A nutrient medium was prepared from the following materials in one liter of water:

| | grams |
|---|---|
| Glycerol | 10 |
| Corn Starch | 10 |
| Hydrolyzed Caseine (NZ amine B) | 20 |
| Distillers' Molasses Solubles (Curbay B.G. | 5 |

The pH of the mixture was adjusted to 7 with potassium hydroxide and 5 grams of calcium carbonate was added followed by steam sterilization for about 30 to 40 minutes. A slant culture of the species *S. argillaceus* ATCC 12956 was transferred to 100 ml. of this medium in a 300 ml. Erlenmeyer flask and shaken 4–5 days until good growth was obtained. Inoculum for a larger fermentation was prepared by transferring the contents of the aforesaid flask under aseptic conditions to one liter of the same medium in a 3 liter flask and shaking the same for 48 hours.

Fifty gallons of nutrient medium having the composition indicated above were prepared, sterilized, and inoculated with the inoculum thus prepared. The organism was then cultivated under submerged conditions of aeration for a period of 3 days. The fermentation broth was filtered with the aid of Super Cel (diatomaceous earth) without adjustment of the pH. The filtrate was then adjusted to pH 2.0 with concentrated sulfuric acid and 10 percent sodium chloride was added per volume of the filtrate.

The filtrate was then twice extracted with 5 gallons of methyl isobutyl ketone. The solvent extracts were separated, combined and evaporated in vacuo to 500 ml. The resulting 500 ml. concentrate was next chromatographed on an acid-washed alumina column prepared with chloroform. The column was developed with chloroform, followed by a 95 percent chloroform-methanol system, and the major proportion of the mithramycin complex was removed with a 90 percent chloroform-methanol system as a reddish-brown fraction.

Approximately 400 ml. of this fraction was evaporated in vacuo to 50 ml. and the resulting concentrate was again chromatographed on an acidwashed alumina column prepared with chloroform. The column was developed as above, i.e. with chloroform, 95 percent chloroform-methanol, and 90 percent chloroform-methanol removing the mithramycin mixture which occurred as a bright yellow band. One-third of the resulting eluate was evaporated in vacuo to dryness, taken into water, filtered, and, on evaporating to dryness, yielded 223 mg. of microcrystalline mithramycine complex. The remaining two-thirds of the eluate was evaporated to dryness, taken into water, filtered and freeze-dried, yielding further product in the form of a bright yellow powder.

EXAMPLE II

A culture of *S. plicatus* ATCC No. 12957 was cultivated in a manner similar to that indicated in Example I, first in a 4-liter glass pot and then in a 150-gallon tank using a medium of the following composition:

| | grams/liter |
|---|---|
| Glucose ("Cerelose") | 10 |
| Soy Bean Meal | 15 |
| Distillers' Solubles | 2.5 |
| Sodium Chloride | 2 |
| Dipotassium Phosphate | 5 |
| Calcium Carbonate | 2 |
| Water | To one liter |

The medium was adjusted to a pH of 7, sterilized, and inoculated with 5 percent by volume of a 48-hour culture grown as aforesaid. The fermentation was continued for a period of 45 hours.

Upon completion of the fermentation, the broth was filtered with about 5 percent Super Cel (diatomaceous earth 5 g./100 cc. broth) and the cake was washed with one-twentieth volume of water. A sample of the filtrate was found to exhibit a high order of antimicrobial activity. The filtrate was adjusted to pH 6.0 and extracted once with one-half volume of n-butanol. The extract was concentrated in vacuo, with the addition of water to lower the distillation temperature, until it reached one-half of the original volume. Further concentration, without the addition of water, was carried out until one-fiftieth of the original volume was reached. The resulting concentrate was permitted to stand at 5° C. for 20 hours, during which time it deposited a tan-colored microcrystalline solid, herein designated as Fraction I. This fraction was separated by filtration and washed with butanol.

The butanol filtrate resulting from the above extraction was then concentrated further in the presence of water to remove most of the solvent. The dark colored residue which resulted was treated with 3 percent acetic acid and extracted three times with equal volumes of ethyl acetate. It was found that all except about 5 to 10 percent of the total microbiological activity passed into the solvent layer. The extract was concentrated to a small volume and added to a column of acid-washed alumina in ethyl acetate. Approximately 15 to 20 grams of alumina were employed per gram of crude solids in the extract, the solids content being about 5 to 10 percent of the extract.

The initial fractions from the column showed no antibacterial activity but on concentration yielded a colorless crystalline solid herein designated as Fraction II. Thereafter, the mixture of mithramycins was eluted from the column with ethyl acetate, followed by 10% ethanol in ethyl acetate. The active fractions were combined and freed from solvent under reduced temperature, whereby the mithramycin mixture was obtained as a bright, amorphous powder.

EXAMPLE III

The fractions obtained by the procedure of Example II were further purified as follows.

Fraction I was crystallized from aqueous butanol, which, after two crystallizations, yielded a colorless product in the form of hexagonal plates.

Fraction II was crystallized twice from a mixture of pyridine and methanol, separating out as colorless needles.

Fraction III (mithramycin mixture) was purified by warming with amyl acetate, filtering and concentrating the filtrate. It separated out as a lemon yellow microcrystalline solid.

EXAMPLE IV

Another fermentation was conducted, as in Example II, with a medium having the following composition:

| | grams/liter |
|---|---|
| Glucose ("Cerelose") | 10 |
| Soy Bean Meal | 15 |
| $K_2HPO_4$ | 5 |
| NaCl | 2 |
| Distillers' Solubles | 2.5 |
| $CaCO_3$ | 2 |
| Water | To one liter |

After adjusting to pH 7.0 and sterilizing, the medium was inoculated with the variant of *S. plicatus* descibed in Table III. The filtered broth was found to be active against Sarcoma 180 in mice, when tested as hereinafter described.

The mixture of mithramycins and the fractions that are produced therewith are quite distinct from one another, as evidenced by a number of their physical and chemical properties. Some of the more important of these properties are summarized in the following table.

Table IX

Physical Properties of Mithramycin Mixture and Fractions I and II

| Property | Fraction I | Fraction II | Fraction III Mithramycin Mixture |
|---|---|---|---|
| Color | white | white | lemon yellow |
| Crystal Structure | hexagonal plates | needles | microscopic prisms |
| Infrared Absorption | $cm^{-1}$ | $cm^{-1}$ | $cm^{-1}$ |
| Maxima (In potassium bromide pellet). | 910 | 720 | 810 |
| | 940 | 730 | 848 |

Table IX—Continued

Physical Properties of Mithramycin Mixture and Fractions I and II

| Property | Fraction I | Fraction II | Fraction III Mithramycin Mixture |
|---|---|---|---|
| Color | white | white | lemon yellow |
| Crystal Structure | hexagonal plates | needles | microscopic prisms |
|  | $cm^{-1}$ | $cm^{-1}$ | $cm^{-1}$ |
|  | 975 | 755 | 905 |
|  | 1046 | 780 | 954 |
|  | 1075 | 790 | 982 |
|  | 1138 | 820 | 1008 |
|  | 1175 | 843 | 1070 |
|  | 1258 | 864 | 1122 |
|  | 1295 | 908 | 1170 |
|  | 1360 | 922 | 1238 |
|  | 1385 | 965 | 1265 |
|  | 1420 | 1010 | 1300 |
|  | 1615 | 1020 | 1335 |
|  | 2800 | 1050 | 1360 |
|  | 3340 | 1100 | 1420 |
|  |  | 1110 | 1515 |
|  |  | 1115 | 1580 |
|  |  | 1185 | 1630 |
|  |  | 1215 | 1730 |
|  |  | 1235 | 2870 |
|  |  | 1280 | 3400 |
|  |  | 1380 |  |
|  |  | 1435 |  |
|  |  | 1490 |  |
|  |  | 1530 |  |
|  |  | 1560 |  |
|  |  | 1580 |  |
|  |  | 1620 |  |
|  |  | 2400 |  |
|  |  | 3100 |  |
|  |  | 3400 |  |
| Ultraviolet Absorption (Methanol Solution) | $\lambda_{max}^{mu}$  $E_{1\,cm}^{1\%}$ | $\lambda_{max}^{mu}$  $E_{1\,cm}^{1\%}$ | $\lambda_{max}^{mu}$  $E_{1\,cm}^{1\%}$ |
|  | 252   8.7 | 255   1000 | 228   213 |
|  | 257   10.2 | 315   400 | 278   460 |
|  | 263   9.1 |  | 317   75 |
|  | 385   1.1 |  | 332   50 |
|  | 405   1.0 |  | 415   97 |
| Optical Activity (Methanol Solution, C=1.0) (Dimethylformamide, C=1.0) | $[a]_D^{25}$ none | $[a]_D^{25}$ none | $[a]_D^{25}$ $-54.9°$ — |
| Melting Point | 255–60° decomp. | 300°C. | 170–75°C. decomp. |
| Analyses | % | % | % |
| Carbon | 55.98 | 67.26 | 55.49 |
| Hydrogen | 8.17 | 4.53 | 7.63 |
| Oxygen (by difference) | 35.85 | 28.21 | 36.88 |
| pK value (in water) | — | — | 7.0 |
| Color with Ferric Chloride | none | none | dark green |
| Reaction with diazonium chloride | negative | bright red | bright red |
| Solubility |  |  |  |
| Slightly soluble in: | water lower alcohols, acetone | most common organic solvents, water | diethylether, benzene, chloroform, amylacetate ethylene dichloride, trichlorethylene, |
| soluble in: | hot water and mixtures of water and lower alcohols, pyridine, dimethyl formamide aqueous NaOH | pyridine, dimethyl formamide aqueous NaOH | water, lower alcohols, i.e. methyl, ethyl propyl, n-butyl, sec. butyl, amyl, hexyl alcohol, acetone, ethyl acetate, methyl isobutyl ketone, benzyl alcohol |
| insoluble in: | non-polar organic solvents, i.e. benzene carbon tetrachloride, petroleum ether | non-polar organic solvents i.e. carbontetrachloride, benzene, petroleum ether | carbon tetrachloride, petroleum ether, cyclohexane |

Useful salts of purified mithramycin A and mithramycin B and mixtures thereof can be prepared by methods well known in the art, as by treatment of the products with an appropriate base, such as sodium hydroxide, potassium hydroxide, lithium hydroxide, ammonium hydroxide or the like, in aqueous solution or under anhydrous conditions. For example, the sodium salt can be prepared by dissolving the base in water and titrating to about pH 10 sodium hydroxide and freeze drying the resulting solution. Other relatively strong bases may, of course, be employed to prepare the corresponding salts.

EXAMPLE V

An *S. plicatus* fermentation is conducted as described in Example II, the whole broth adjusted to pH 4.0, and the mycelium filtered. An activated magnesium silicate (30–60 mesh) column (Florisil, Floridin Co.) is prepared containing 75 g. of absorbent per gallon of fermentation broth. The filtered broth is then passed through the column at a free rate of 30–40 gal. per hour. After the entire batch of filtered broth has been fed to the column, it is followed by water which washes the broth in the column through. The water wash is discontinued when the effluent is colorless or when the total solids contained therein falls to about 1 mg./ml. The solids content of effluent broth is about 20 mg./ml.

The column prepared in this fashion is then eluted with methanol. Fractions of convenient size are collected and their optical density at 280 mμ is measured. Those fractions having an optical density in excess of 2.0 are combined. A plate assay for activity against *Staphylococcus aureus* on each of these fractions is conducted.

The combined methanol eluate fractions containing active material are then concentrated to dryness, dissolved in a solvent mixture made up of three parts by volume of ethyl acetate and one part by volume of benzene. A chromatographic column having a 2 ½ inch diameter and 15 inch length is then prepared employing a 2:1 mixture of silicic acid and cellulose powder (weight basis) as packing using the same solvent mixture in packing the column.

A portion of the ethyl acetate concentrate containing 5 to 8 g. of a mixture of mithramycins is then added to the column and the column developed with ethyl acetate collecting the eluate in 400 ml. fractions. Mithramycin A is rapidly eluted, traveling almost with the solvent front. The bulk of it is obtained in the first 10 fractions (4 l.), but an additional 15 fractions (6 l.), containing a small amount of additional material due to tailing, are collected. The eluting solvent is then changed to ethyl acetate containing 5 percent by volume of methanol. Mithramycin B is collected in fractions 60–100. The progress of column development is readily followed visually either in ordinary room light or ultra-violet light.

The fractions containing mithramycin A and mithramycin B are separately evaporated; the residues crystallized from n-butyl acetate or amyl acetate yielding the products in pure crystalline form. They exhibit the properties tabulated in Table IV.

Alternatively, the pure crystalline sodium salts of mithramycin A and mithramycin B can be prepared by concentration of the combined eluate fractions to a small volume and extraction thereof with water, adjustment of the water extracts to pH 8.0 with sodium hydroxide, freezing of the alkaline extract, and drying thereof from the frozen state. Other metal and organic base salts can be prepared in analogous fashion by substitution of the appropriate base. For instance, the calcium, magnesium, zinc, aluminum, ammonium, β-hydroxyethylammonium, procaine, triethylammonium, ethylene diamine, potassium, lithium, ferric, and ferrous salts are thus prepared. The physical properties of the sodium salt of mithramycin A are listed in Table III.

EXAMPLE VI

A mixture of mithramycins A and B can be conveniently prepared in purified microcrystalline form from the methanolic eluate prepared as described in the first two paragraphs of Example V by concentration thereof to a low volume resulting in removal from the bulk of the methanol from the solution and extraction of the concentrate with ethyl acetate at pH 4.0. The ethyl acetate extracts are then combined and concentrated to a convenient volume for countercurrent distribution in a 100 tube automatic apparatus. They are distributed against 3 percent phosphate pH 7.0 to 7.5 buffer. The contents of the tubes are combined in groups of then and assayed by the *B. subtilis* plate assay.

The bulk of the activity is found in tubes 80 through 160. These fractions are combined and concentrated to a small volume, ether is added thereto and the mixture is extracted with water. The water layer is freed of solvent by evaporation, frozen, and dried from the frozen state. A yellow amorphous solid comprised of a mixture of approximately 85 to 95 percent mithramycin A and 5 to 15 percent of mithramycin B is obtained.

The pure crystalline sodium salt of mithramycin A is prepared from the aqueous extract described in the previous paragraph by adjusting it to pH 8.0 with sodium hydroxide and drying from the frozen state. The residue is crystallized from methanol or ethanol. A crystalline product is collected and recrystallized from 1:1 aqueous methanol yielding the pure crystalline dehydrated sodium salt as bright yellow elongated rectangular prismatic crystals.

Occasionally, during the course of countercurrent distribution in this fashion the sodium salts of a mixture of the mithramycins A and B separate in the tubes containing the highest concentration thereof. The sodium salts are moderately soluble in water but only slightly soluble in aqueous sodium chloride or sodium phosphate solutions. Their solubility in lower alkanols is very low and they are almost insoluble in the common organic solvents. The physical properties of pure crystalline sodium mithramycin A are listed in Table III.

EXAMPLE VII

An *S. plicatus* fermentation is conducted as described in Example II, the whole broth adjusted to pH 5 and the mycelium filtered. The filtrate is extracted with one-third volume n-butanol and the extract concentrated azeotropically. The concentrate is shaken between water and isopropyl ether (1:1), the phases separated and the aqueous phase brought to pH 7 with dilute sodium hydroxide solution. The neutralized solution is then freeze-dried and the residue extracted with ethanol. The ethanol extract is concentrated in vacuo to a thick solution whereupon the sodium salt of mithramycin A crystallizes and is filtered off. The filtrate is concentrated, transferred to ethyl acetate from an acid solution (pH 2–3) and adsorbed on a silicic acid column. Elution of the column with 5% methanol-ethyl acetate gives a mixture containing predominantly mithramycin A with up to 5 percent of mithramycin B.

A mixture richer in mithramycin B is obtained by eluting the column with 25 percent methanol-ethyl acetate.

EXAMPLE VIII

The organism, *Streptomyces plicatus* ATCC 12,957, was grown in submerged culture in a medium composed of the following ingredients in grams per liter of water:

| | |
|---|---|
| Glucose | 10 |
| Soy bean meal | 15 |
| Corn Starch | 10 |
| NZ amine YTT | 5 |
| Butyl molasses solubles | 5 |
| Sodium chloride | 5 |
| Calcium carbonate | 2 |

A 2 to 3 day old vegetative inoculum was used to the extent of one to five per cent and the fermentation carried out for about 4 days at 28° – 30° C. (The progress of the fermentation can be followed by a *Bacillus subtilis* plate assay at a suitable dilution).

The culture liquid was filtered with the aid of 1 to 2 per cent Hyflo Supercel at the existing pH (7.0 – 7.5). The filtrate was adjusted to pH 5.0–5.5 and extracted once with n-butanol (25 per cent of the volume of the broth). The extract was separated, clarified and concentrated in the presence of water until almost all the solvent was removed. The concentrate was then shaken with an equal volume of isopropyl ether to remove oily impurities, then extracted twice with ethyl acetate at pH 2.0–3.0. The solvent extract was concentrated to a small volume and chromatographed on a column of acid-washed alumina (20 to 30 grams per gram of solids) made up in ethyl acetate. The sample was applied to the column and the latter eluted first with ethyl acetate and then with ethyl acetate containing increasing amounts of methanol. The bulk of the activity was recovered in the 10 to 20 per cent methanol-ethyl acetate eluate. The compound was recovered by concentration of the active fractions and crystallized twice from acetone. Mithramycin A separates as a bright yellow crystalline solid.

The homogeneity of the product was demonstrated in the following thin layer chromatography system: Methyl ethyl ketone-isopropanol-methanol (8:1:1) Silica Gel G. $R_f = 0.60$.

Further solution of the column with 25 percent methanol-ethylacetate affords predominantly mithramycin C and minor amounts of mithramycin B. This product is purified by chromatography on a silicic acid column (made up in ethyl acetate) followed by elution first with ethyl acetate and then with ethyl acetate containing increasing amounts of methanol. The C component is recovered from the 5 to 10 percent methanol-ethyl acetate eluate.

EXAMPLE IX

The fermentation procedure of Example VIII is followed and the products recovered by the following modified process.

The whole broth (approximately 1000 gallons) is filtered on an Oliver rotary filter, the pre-coat of which is neutralized with caustic soda to pH 6.0–7.0.

Fifty to one hundred pounds of Hyflo Supercel are added to the broth with agitation before filtration on the Oliver.

The filtrate is received in a tank suitable for solvent extraction. After filtration is complete the pH of the broth is adjusted to 5.0–5.5 with acid and saturated with n-butanol. The saturated broth filtrate is passed over a Podbielniack separator against n-butanol at 3 to 1 ratio.

The spent liquor (raffinate) is collected in a suitable tank and assayed against *B. subtilis*. The raffinate is discarded if the assay indicates that the activity is low (<20% of the original).

The butanol extract is sparkled, then concentrated in vacuo at 30°–35° C. to remove the solvent, water being added throughout to aid in removal of the butanol. A solution of 0.1 percent dibasic phosphate buffer ($Na^+$ or $K^+$) is added to the vacuum pan to neutralize the residual acids and concentration continued until all the solvent is removed and the volume is less than 10 percent of the original volume.

The concentrate is then washed with isopropyl ether to remove oils present, re-concentrated to remove the isopropyl ether then stirred with 10–15 percent sodium chloride. The pH is adjusted to 2–3 with acid, and the acidified concentrate extracted twice with ethyl acetate. The spent liquor (ethyl acetate raffinate) is then stirred with 5 lbs./50 gals. Hyflo Supercel and filtered.

The filter cake is suspended twice in methanol, filtration being carried out after each suspension. The spent liquor (after filtration) is assayed, and then discarded if potency is low.

The ethyl acetate-methanol filtrates are concentrated in vacuo (30°–35° C.) then put on a Florisil column made up in ethyl acetate (15–30 gms. per gm. solid). The column is eluted with ethyl acetate, then with ethyl acetate containing increasing amounts of methanol.

Most of the activity comes off in the 10–20 percent methanol fraction. The mithramycin A is then recovered by concentration of the active fractions, and crystallation of the solid obtained.

Activity in the broth, solvent extracts and column fractions can be followed by biological assay with *Bacillus subtilis* or *Streptomyces aureus*, or by optical density at 280 mu.

The B and C components are isolated by the procedure of Example VIII.

EXAMPLE X

Purification and Characterization of Mithramycin C

The fermentation procedure is the same as that described in Example II. The recovery procedure used is shown in the flow sheet.

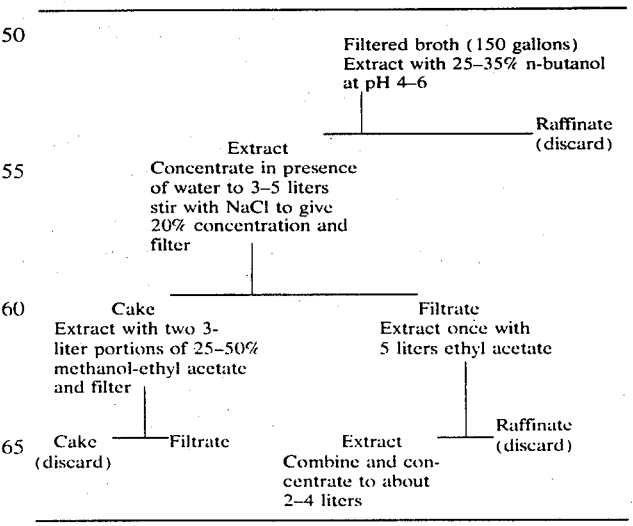

The concentrate from the above flow sheet is stirred with 500–800 g. of Florisil and the slurry is diluted with 2–4 liters of ethyl acetate. The slurry is added to a column of Florisil (3–5 kg.) in ethyl acetate. The column is eluted successively with ethyl acetate, 10, 20 and 40 percent methanol in ethyl acetate. The first two solvent eluates contain inert substances as shown by lack of activity against *B. subtilis*. The 20 percent methanol-ethyl acetate fraction contains almost essentially mithramycin A fraction. The last eluate contains the residual quantities of mithramycin A and the bulk of mithramycin C.

Concentration of the 20 percent methanol-ethyl acetate fraction to a small volume (1.5–2.5 liters) yields a crystalline solid, the magnesium chelate of mithramycin A. This can be recrystallized from methanol-ethyl acetate (1:3) for further purification.

The magnesium chelate crystallizes as large hexagonal prisms which decompose gradually at 210°–215° C.

Analysis Calcd. for $(C_{52}H_{75}O_{24})Mg \cdot 2H_2O$: C, 56.04; H, 6.96; Mg 1.09%; Found: C, 55.64; H, 7.19; Mg 1.15%.

When titrated in 50 percent aqueous methanol with hydrochloric acid, it shows a $pK_a$ value of 4.5–4.7 and an equivalent weight of 1110. The equivalent weight calculated for $(C_{52}H_{75}O_{242}Mg$ is 1114.

The crystalline magnesium chelate is converted to mithramycin A by stirring between water and ethyl acetate while adding hydrochloric acid to pH 3.0–4.0. The solvent layer is separated and the aqueous layer extracted twice more, preferably in the presence of 5–10 percent salt. The combined solvent layers are concentrated to dryness and the solid is crystallized from acetone. Mithramycin A separates as a bright yellow crystalline solid from acetone.

Titration in 50 percent aqueous methanol with sodium hydroxide shows a $pK_a$ value of $7.6 \pm 0.2$ and an equivalent weight of $1115 \pm 15$. (Calculated for $C_{52}H_{76}O_{24} \cdot 2H_2O = 1120$).

The mother liquors from the crystallization of the magnesium chelate are added to the 40 percent methanol-ethyl acetate eluate of the Florisil column and concentrated to a small volume. This concentrate is shaken with acid water (pH 3–4) to convert the sample to the free acid form. The solvent layer is concentrated to remove most of the methanol and added to a column of silicic acid-cellulose (2:1) in ethyl acetate. About 15–25 g. of silicic acid is used per gram of the crude mithramycin as estimated by optical density at 280 m$\mu$ using the relationship 50,000 optical density units equal 1 g. The column is eluted with ethyl acetate, 3–5 percent methanol-ethyl acetate, 10 percent methanol-ethyl acetate. The progress of the column is followed by optical density and the solvents are changed as the need arises. Usually, mithramycin A appears with the ethyl acetate and, if the band moves too slowly, one can use the 3–5 percent methanol-ethyl acetate to speed its elution. The mithramycin C is eluted either with the 3–5 percent methanol-ethyl acetate or 10 percent methanol. The fractions are tested by thin layer chromatography in the system: methanol-isopropanol-methyl ethyl ketone (1:1:8). Mithramycin A has an Rf of 0.6–0.7 while mithramycin C has an Rf of 0.15–0.25. Fractions which contain mostly the C component are combined, concentrated to dryness and crystallized from acetone. Its solubility is similar to that of mithramycin A. Mithramycin B was not observed in this example.

The microbiological activity as well as other biological activities are of much lower degree than those of mithramycin A as shown below. The values shown below are the diameters of the zones in the disc assay method using *B. subtilis*.

| Concentration | Mithramycin A | Mithramycin C |
| --- | --- | --- |
| 50 γ/cc | 25.8 | 20.8 |
| 25 | 24.5 | 18.4 |
| 12.5 | 23.0 | 16.8 |

Salts of mithramycin C, such as the sodium, lithium, potassium and ammonium salts, are prepared according to the procedure of Example IV.

EXAMPLE XI

Several fermentations were carried out with *S. plicatus* (Parke-Davis & Company, Culture Bureau, Detroit, Michigan, No. 04918) using the following medium.

| | gms./liter |
| --- | --- |
| Glucose (Cerelose) | 10 |
| Corn Starch | 10 |
| Hydrolyzed Casein (NZ Amine B) | 5 |
| Distiller's Solubles | 5 |
| Sodium Chloride | 5 |
| Soy Bean Meal | 15 |
| Calcium Carbonate | 1 |
| Water | To one liter |

The mixture was adjusted to pH 7 then sterilized. A plug from a slant culture of *S. plicatus* (Parke-Davis & Company culture No. 04918) was placed in 200 ml. of this media in a shake flask and the flask shaken for three days. Two thousand ml. of this medium in a 4 l. pot was inoculated aseptically with 1 percent (20 ml.) of the inoculum from the shake flask. A series of such pots was set up and fermentation run for periods of 24, 48, 72 and 96 hours.

Upon completion of the fermentation each of the broths was filtered and extracted with n-butanol at pH 5. The butanolic extractions were concentrated to near dryness. The concentrates were shaken with methanol, the methanolic solution filtered then subjected to thin layer chromatography in the systems methyl ethyl ketone:isopropanol:methanol (8:1:1) silica gel G; and 0.02 N sodium chloride on diethylaminoethylcellulose.

The methanol filtrate was chromatographed on Florosil as described in Example V and the column eluted successively with methanol-ethyl acetate in which the methanol concentrations were 5, 10, 20 and 40 percent, respectively. The eluates were combined, concentrated to near dryness and the residue taken up in methanol. The ultraviolet spectrum of the eluates showed maximum absorption at approximately 262 m$\mu$. The mithramycins, as noted above, exhibit maximum absorption in the ultraviolet at 280 m$\mu$.

Thin layer chromatography of the concentrated eluates in the above mentioned systems, and paper chromatograms in the systems butanol:acetic acid:water (5:1:4) and butanol saturated with water showed no mithramycins were present. All chromatograms were run against a mixture of mithramycins A, B and C for comparison.

The above experiments demonstrate that no mithramycin was produced by *S. plicatus* (Parke-Davis and Company culture No. 04918).

What is claimed is:

1. Mithramycin A, an acidic substance which is relatively soluble in water, lower alcohols, acetone, ethyl acetate and methyl isobutyl ketone, slightly soluble in diethyl ether and benzene, and substantially insoluble in petroleum ether, carbon tetrachloride and cyclohexane, which is capable of forming salts with bases, the pure crystalline dihydrate of which is yellow and contains the elements carbon, hydrogen, and oxygen in substantially the following percentages by weight: Carbon 55.5%, Hydrogen 7.2%, Oxygen 37.3% (by difference) and has the molecular formula $C_{52}H_{76}O_{24} \cdot 2H_2O$; which displays ultraviolet absorption maxima in methanol solution at 230 and 278 m$\mu$, which has an equivalent weight of substantially 1115 ± 15 and a p$K_a$ value of 7.6 ± 0.2, which exhibits a dull yellow fluorescence when irradiated with ultraviolet light, and which as a 0.03 percent dispersion in potassium bromide exhibits absorption maxima in the infrared region of the spectrum at 736, 763, 803, 847, 901, 950, 978, 1000, 1064, 1118, 1160, 1228, 1259, 1293, 1320, 1370, 1396, 1440, 1500, 1580, 1626, 1720, 2850, 2910, 2950, 3390, cm$^{-1}$, and which when dissolved in methanol at a concentration of 1 percent has the specific rotation −58°; the crystalline anhydrous form of which is yellow, melts at 184°–187° C. and contains the elements carbon, hydrogen and oxygen in substantially the following percentages by weight: Carbon 57.70%, Hydrogen 7.2%, Oxygen 35.1%, (by difference) and has the molecular formula $C_{52}H_{76}O_{24}$; and which displays ultraviolet absorption maxima in methanol solution at 230 and 278 m$\mu$ and which as an 0.03 percent dispersion in potassium bromide exhibits absorption maxima in the infrared region of the spectrum at 806, 852, 908, 952, 983, 1004, 1071, 1126, 1170, 1236, 1266, 1300, 1330, 1374, 1515, 1631, 1724, 2890 and 3413 cm.$^{-1}$; and which on thin layer chromatography in the system methanol: isopropanol:methyl ethyl ketone (1:1:8) has an $R_f$ value of 0.6–0.7; the crystalline magnesium salt of which is bright yellow, decomposes at 210°–215° C., has a p$K_a$ value of 4.5–4.7 and an equivalent weight of 1110, and contains the elements carbon, hydrogen and magnesium is substantially the following percentages by weight: Carbon 55.64%, Hydrogen 7.19%, Magnesium 1.15% and has the molecular formula $(C_{52}H_{75}O_{24})_2Mg$; the pure crystalline dihydrated sodium salt of which is bright yellow and contains the elements carbon and hydrogen in substantially the following percentages by weight: Carbon 54.65%, Hydrogen 6.95% and has the molecular formula $C_{52}H_{75}O_{24}Na \cdot 2H_2O$, which displays ultraviolet absorption maxima in methanol solution at 240, 285, 315, and 425 m$\mu$ and when dissolved in methanol at a concentration of 1 percent has the specific rotation +38.8°.

2. A basic salt of the substance defined in claim 1.

3. Mithramycin B, an acidic substance which is highly soluble in water, lower alcohols, acetone, ethyl acetate and methyl isobutyl ketone, slightly soluble in diethyl ether and benzene, and substantially insoluble in petroleum ether, carbon tetrachloride, and cyclohexane, which is capable of forming salts with bases, the pure crystalline form of which is orange-yellow and contains the elements carbon, hydrogen, and oxygen in substantially the following percentages by weight: Carbon 55.22%, Hydrogen 7.13%, Oxygen 37.65%, (by difference) which displays ultra-violet absorption maxima in methanol solution at 230, 290, 320 and 410 m$\mu$, which exhibits a bright yellow fluorescence when irradiated with ultra-violet light, and which as a 0.03 percent dispersion in potassium bromide exhibits absorption maxima in the infrared region of the spectrum at 722, 743, 808, 847, 903, 948, 978, 1000, 1063, 1116, 1160, 1228, 1260, 1322, 1347, 1368, 1430, 1440, 1500, 1585, 1630, 1720, 2850, 2900, 2940, 3380 cm$^{-1}$.

4. A basic salt of the substance defined in claim 3.

5. Mithramycin C, an acidic substance soluble in water, lower alcohols, ethyl acetate, acetone and methyl isobutyl ketone, slightly soluble in diethyl ether and benzene, and substantially insoluble in petroleum ether, carbon tetrachloride and cyclohexane, which is capable of forming salts with bases, the pure crystalline form of which is bright yellow, melts at 182°–184° C. and contains the elements carbon, hydrogen and oxygen in substantially the following percentages by weight: Carbon 55.25%, Hydrogen 6.99%, Oxygen 37.76%, (by difference) which displays ultra-violet absorption maxima in methanol solution at 230 and 280 m$\mu$, and which as a 0.03 percent dispersion in potassium bromide exhibits absorption maxima in the infrared region of the spectrum at 848, 905, 980, 1020, 1070, 1166, 1233, 1266, 1299, 1408, 1515, 1634, 1706 and 3436 cm.$^{-1}$, and which on thin layer chromatography in the system methanol:isopropanol:methyl ethyl ketone (1:1:8) has an $R_f$ value of 0.15–0.25.

6. A basic salt of the substance defined in claim 5.

7. The process for producing mithramycin which comprises cultivating *Streptomyces plicatus* ATCC 12957 in an aqueous nutrient medium under agitated submerged, aerobic conditions at a temperature of from about 24° to 30°C. for a period of from about one day to about four days until substantial antimicrobial activity is imparted to such medium.

8. The process claimed in claim 7 wherein a substance selected from the group consisting of mithramycin A, mithramycin B and mithramycin C is recovered from the fermentation broth by filtering the broth, adjusting the filtrate to a pH of about 6, extracting the filtrate with n-butanol, concentrating the extract, allowing the concentrated extract to stand to effect crystallization of a portion of said substance, removing the crystals by filtration, concentrating and acidifying the filtrate, extracting the filtrate with ethyl acetate, concentrating the extract, absorbing said substance from the extract on acid-washed alumina employing 15–20 parts alumina per part solids in said concentrated extract.

9. The process for producing mithramycin which comprises cultivating *Streptomyces argillaceus* having the same identifying characteristics as ATCC 12956, in an aqueous nutrient medium under agitated submerged, aerobic conditions, at a temperature from about 24°C. to 30°C. for a period of from about one day to about four days, until substantial antimicrobial activity is imparted to such medium.

10. The product of the process of claim 9.

11. A basic salt of the substance defined in claim 10.

12. The process claimed in claim 9 wherein a substance selected from the group consisting of mithramycin A, mithramycin B and mithramycin C is recovered from the fermentation broth by filtering the broth, adjusting the filtrate to a pH of about 2, extracting the filtrate with methyl isobutyl ketone, concentrating the extract, absorbing the concentrate on acid-washed alumina and eluting the mithramycin therefrom with 95 percent chloroformmethanol.

13. The process claimed in claim 9 wherein a substance selected from the group consisting of mithramycin A, mithramycin B and mithramycin C is recovered from the fermentation broth by filtering the broth, adjusting the filtrate to a pH of about 6, extracting the filtrate with n-butanol, concentrating the extract, allowing the concentrated extract to stand to effect crystallization of a portion of said substance, removing the crystals by filtration, concentrating and acidifying the filtrate, extracting the filtrate with ethyl acetate, concentrating the extract, absorbing said substance from the extract on acid-washed alumina employing 15–20 parts alumina per part solids in said concentrated extract and eluting the mithramycin therefrom with ethyl acetate followed by 10 percent ethanol in ethyl acetate.

14. A process for separating mithramycin A as defined in claim 1 and mithramycin B as defined in claim 3 from the fermentation broth containing same, which comprises contacting said broth with ethyl acetate a solid mixture of two parts by weight silicic acid and one part by weight cellulose powder having the mixture of mithramycin A and mithramycin B absorbed thereon, whereby mithramycin A is selectively eluted therefrom, and thereafter contacting said solid mixture with ethyl acetate containing 5 percent by volume of methanol, whereby mithramycin B is eluted therefrom.

15. A process for separating mithramycin A as defined in claim 1 and mithramycin C as defined in claim 16 from the fermentation broth containing same, which comprises adsorbing the mixture of mithramycin A and mithramycin C on an adsorbent selected from the group consisting of acid washed alumina and activated magnesium silicate, the amount of acid washed alumina being 20–30 parts per part solids in said mixture, then contacting said adsorbent with ethyl acetate at a pH of about 2–3, whereby mithramycin A is selectively eluted therefrom, and thereafter contacting said adsorbent with ethyl acetate containing up to 10–20 percent by volume of methanol, whereby mithramycin C is eluted therefrom.

* * * * *

UNITED STATES PATENT AND TRADEMARK OFFICE
CERTIFICATE OF CORRECTION

PATENT NO. : 3,906,093
DATED : September 16, 1975
INVENTOR(S) : BEN A. SOBIN ET AL It is certified that error appears in the above-identified patent and that said Letters Patent are hereby corrected as shown below:

Col. 15, line 11 change "mithramycin B" to -- mithramycin C --.

Col. 25, line 21 change "$(C_{52}H_{75}O_{24})Mg \cdot 2H_2O$:" to -- $(C_{52}H_{75}O_{24})_2Mg \cdot 2H_2O$: --.

Col. 25, line 27 change "$(C_{52}H_{75}O_{24}2Mg$" to -- $(C_{52}H_{75}O_{24})_2Mg$ --.

Col. 28, line 53 change "absorbing" to -- adsorbing --.

Col. 29, line 19 change "absorbing" to -- adsorbing --.

Col. 30, line 12 change "16" to -- 5 --.

Signed and Sealed this seventeenth Day of February 1976

[SEAL]

Attest:

RUTH C. MASON
Attesting Officer

C. MARSHALL DANN
Commissioner of Patents and Trademarks